May 7, 1929.  I. B. GILBERT  1,711,593
REGRINDING VALVE
Filed Oct. 21, 1926
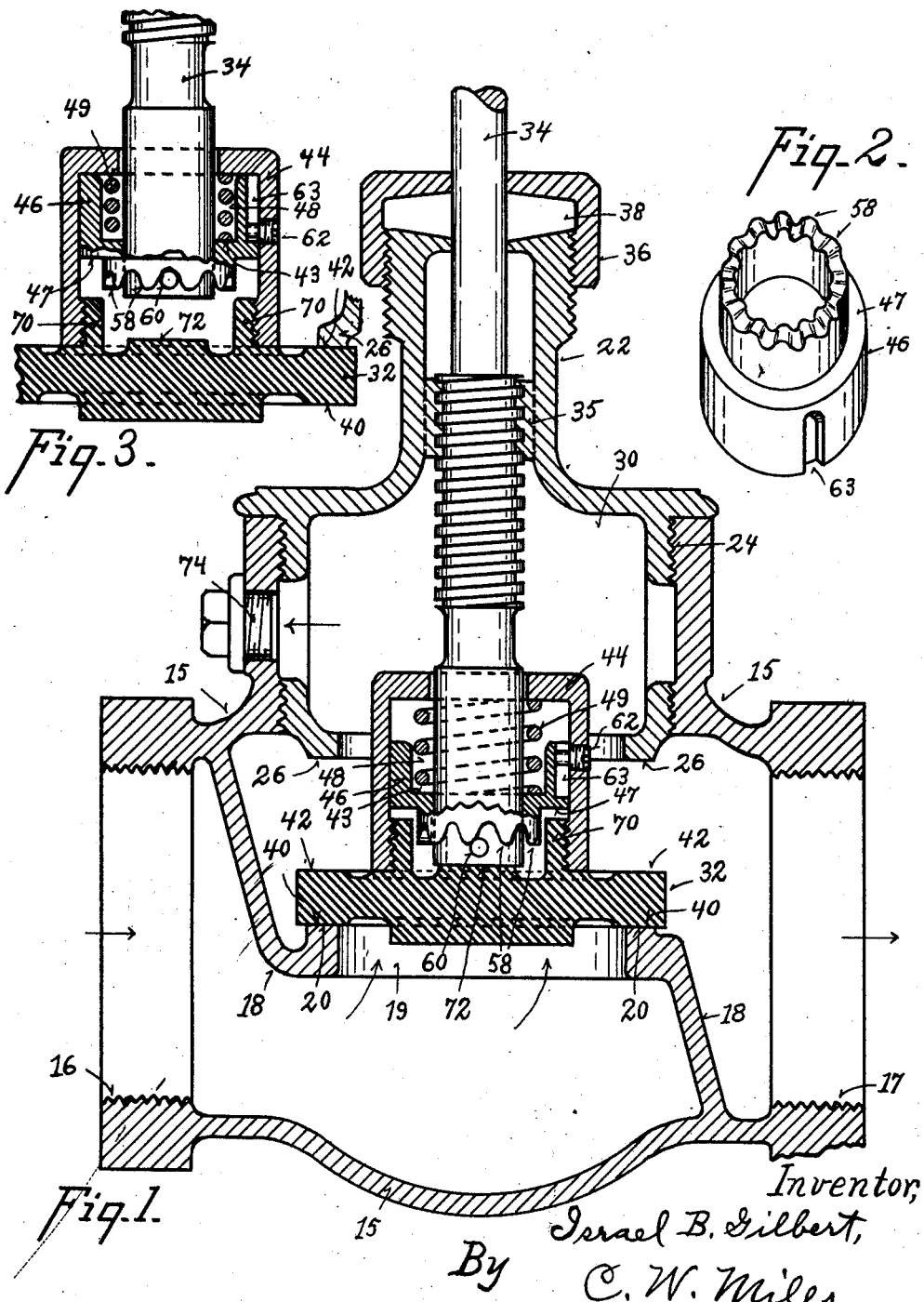
Inventor,
Israel B. Gilbert,
By C. W. Miles,
Attorney.

Patented May 7, 1929.

1,711,593

UNITED STATES PATENT OFFICE.

ISRAEL B. GILBERT, OF CINCINNATI, OHIO.

REGRINDING VALVE.

Application filed October 21, 1926. Serial No. 143,236.

My invention relates to improvements in valves. One of its objects is to provide an improved regrinding or self-grinding valve adapted to long continued periods of use in steam, hot water, and other fluid conduits. Another object is to provide a self grinding valve adapted to grind under pressure of the valve head upon its seat. Another object is to provide an improved valve having a valve seat to close the conduit in which it is mounted and a valve seat to cut off any escape or leakage of fluid through the stuffing box or along the valve stem, and to enable the stuffing box to be repacked without cutting off the flow of fluid through the conduit or removing the valve, and improved means to self-grind the valve upon each of its seats. Another object is to provide an improved valve structure comprising a valve adapted to seat at opposite faces upon separate valve seats and to automatically regrind itself into operative contact with each of said valve seats. My invention also comprises certain details of form, and combination of components, all of which will be fully set forth in the description of the accompanying drawings in which:

Fig. 1 is a central vertical section through a valve embodying my improvements.

Fig. 2 is a perspective view of one of the automatic clutch or coupling members detached.

Fig. 3 is a sectional detail showing the operative members of Fig. 1 in a different position.

The accompanying drawings illustrate the preferred embodiment of my invention, in which 15 represents the main valve shell or casing, to opposite ends of which pipe sections are adapted to be connected by means of screw threads 16 and 17. The valve casing 15 is provided with a partition plate 18 through which is a valve port 19 encircled by a main valve seat 20. A bonnet 22 is threaded at 24 to the valve casing and the lower annular edge of the bonnet is provided with an annular valve seat 26 to enable all communication between the valve chamber 28 and the chamber 30 of the bonnet to be cut off when the valve head 32 is applied to the valve seat 26. A valve stem 34 is threaded at 35 to the bonnet 22 so as to feed the valve stem endwise relative to the bonnet when the valve stem is rotated. A gland 36 is threaded to the upper end of the bonnet to provide a chamber or stuffing box 38 in which packing material is confined and compressed to prevent fluid leakage past the packing in the stuffing box 38, around or along the valve stem to the exterior of the valve casing and bonnet.

The valve head 32 is provided with an annular valve face 40 to make contact with the main valve seat 20 to close the port 19, and with an annular valve face 42 opposite the valve face 40 to make close contact with the valve seat 26 to prevent the escape of any fluid into the bonnet or past the packing to the exterior of the bonnet, and particularly to effectually close off and prevent the escape of fluid from the valve chamber to the bonnet while the packing is being removed from the stuffing box 38 and renewed or replenished therein.

The valve head 32 is mounted relative to the valve seats 20 and 26 and the inner end of the valve stem 34 in the following manner; the valve head 32 is provided with an annular screw-threaded flange 70 to which is threaded a chambered cap 44. The cap 44 is screwed firmly on the flange 70, and is preferably locked thereto by means of a set-screw key, or similar known means to prevent the cap 44 becoming unscrewed from the flange 70. Within the cap 44 is a tubular sleeve or member 46 having a limited movement within said cap endwise of the valve stem. The sleeve 46 has a shoulder 47 adapted to seat upon the end of the flange 70 to limit its movement endwise of the valve stem in one direction, and the opposite end of sleeve engaging the inner face of the cap 44 limits its movement in the opposite direction. The sleeve 46 is also provided with a recess 48 between said sleeve and the valve stem. The recess 48 serves as a housing for a spring 49, the upper end of which spring seats against the inner face of the end of the cap 44, and the lower end of the spring seats upon an annular shoulder 43 of the sleeve 46 to yieldingly press the sleeve away from the end of the cap and toward the valve head 32. The end of the sleeve 46 toward the valve head 32 is provided with a series of cam faces or teeth 58 which are adapted to yieldingly engage opposite ends of a pin 60, which is carried rigidly by the valve stem 34 with opposite ends of said pin projecting beyond the cylindrical face of the valve stem into position to be engaged by the teeth 58 of the sleeve 46. A section 72 of the valve head is in position to be engaged by the end of the valve stem 34 to force the valve 32 rigidly and positively against its seat 20, and against pressure of a fluid tending to pass upwardly through the valve port 19 which is the preferable direction in which to face the valve in its conduit. A pin or set screw 62 carried by the cap 44 enters a slot or keyway 63 in the outer face of the sleeve 46 to prevent the sleeve rotating relative to the cap 44 or valve head 32, but permitting the sleeve 46 to move endwise within the cap 44.

While the valve head 32 is out of contact with its seats 20 and 26 the spring 49 forces the teeth 58 of the sleeve 46 yieldingly into engagement with the pin 60 so that the ends of the pin occupy two of the depressions between the teeth 58. The shoulder 47 is also in contact with the end of the flange 70 before the end of the stem 34 contacts with the valve face 72, and the sleeve and valve head rotate with the valve stem. Covering the period when the valve stem forces the valve face 40 into contact with the valve seat 20 against an upward pressure from the fluid, the first contact of the valve head with the seat 20 tends by friction to prevent rotation of the valve upon its seat or with the valve stem, while at the same time the cam teeth 58, due to this frictional resistance tend to climb over the ends of the pin 60 as indicated in Fig. 1, and this tendency for the teeth 58 to climb over the pin 60 is resisted by the spring 49, which in turn reacts to cause the valve face 40 to move to a limited extent rotatably upon and in contact under moderate pressure with the valve seat 20, and thereby to automatically grind or regrind the valve faces and keep its faces 40 and 20 automatically clean, smooth, and free from dirt or foreign matter, and to prevent grooves or channels being worn in either of the faces 40 or 20, due to wire-drawing or frictional action of the fluid under pressure across said faces 40 and 20, when the valve is partly open. As the valve closes, the friction between the faces 40 and 20 increases progressively so that the rotation or grinding action of the valve faces occurs while the pressure between the faces 40 and 20 is of moderate degree, and ceases as soon as the pressure between the valve head and its seat becomes sufficient to cause the spring 49 to yield and the teeth 58 to climb over the pin 60 in preference to propelling the valve head rotatively upon its seat. By this arrangement I am enabled to grind the faces 40 and 20 under conditions adapted to attain perfect results, that is positive downward pressure or feed of the valve stem against the valve head to close the valve against an upwardly or opposite fluid pressure, and a rotary or grinding action between the faces of the valve head and valve seat while held positively in contact as distinguished from yieldingly or resiliently in contact.

When the valve head is retracted from its seat, a grinding action in a reverse direction and under like conditions occurs between the faces 40 and 20 just prior to the lifting of the face 40 away from the face 20. From time to time one or more of the teeth 58 climb and slip past the pin 60, which results in the valve changing its position rotatively relative to its seat 20 and the stem 34, so that the grinding action is evenly distributed about the circumference of the valve faces, and the contact faces are kept true and no high places or irregularities are allowed to develop therein.

The operation is as follows; when the valve stem is rotated to feed the stem toward the port 19, the valve head 32 feeds with the stem, being clutched yieldingly thereto by the pin 60 engaging the teeth 58, and held yieldingly in engagement by the spring 49. As soon as the valve face 40 engages the valve seat 20, friction between the faces 40 and 20 tends to prevent rotation of the valve head upon the seat 20, and results from engagement of the end of the valve stem with the section 72 of the valve head 32 to develop a positive pressure between the faces 40 and 20, to hold said faces unyieldingly in contact and with progressively increasing pressure as the valve stem is progressively rotated to lock the valve head to its seat. The frictional contact between the faces 40 and 20 causes the spring 49 to yield to intermittently unclutch the valve head 32 from the valve stem at the teeth 58 and pin 60, but not until after the teeth 58 and pin 60 have acted to rotate the face 40 to a limited extent under moderate positive pressure relative to the face 20, to thereby clean and true the surfaces 40 and 20 at each operation of the valve, and alternately in reverse directions.

At the extreme movement of the valve head 32 away from its seat 20, the valve face 42 makes contact with the valve seat 26 to cut off communication between the valve chamber 28 and the bonnet chamber 30, and the pin 60 being held by the spring 49 in engagement with the teeth 58, the spring 49 is compressed to a greater or less extent after the valve seats 42 and 26 engage, while the valve head 32 continues to rotate with the valve stem under moderate pressure of the valve upon its seat, to thereby self grind the valve faces 42 and 26, substantially as heretofore described. Ultimately the upper end of the sleeve 46 will positively engage the inner face of the cap 44 to positively clamp the valve head against the valve seat 26 substantially as indicated in Fig. 3. Where a relatively light spring 49 is employed, the teeth 58 may be made to climb the pin 60 due to frictional engagement between the valve faces 42 and 26, before the end of the sleeve 46 engages the inner face of the end of cap 44. Upon releasing the valve head 32 from its seat 26 a grinding action in a reverse direction is had under moderate pressure until the valve head is free from the seat 26.

The valve is thus located in the valve chamber intermediate of two valve seats, and is operable from the exterior by a single valve stem and simple and reliable means to seat the valve head firmly upon either valve seat, and to have an automatic grinding action under conditions of pressure of the valve upon its seat, also a grinding action in opposite directions upon each seat. The valve is thus adapted for use over long periods of continuous service, and where a shut-down of the apparatus for repairs to the valve would be difficult or objectionable, and to continuously maintain both valve seats and valve faces in perfect operative condition, and to insure the stuffing box being repacked whenever required without injuring the operator or removing the valve or interrupting the use of the valve. The valve is also adapted to be used as a two-way valve, which may be attained for instance by connecting a second off-take pipe or blow-off cock in place of the plug 74.

The apparatus herein shown and described is capable of considerable modification within the scope of the claims, without departing from the spirit of my invention.

What I claim is:

1. A regrinding valve comprising a valve casing having two opposed valve seats, a valve member movable to selectively cover and uncover said respective valve seats to open and close independent passages, a valve stem operable to adjust said valve member to and from said respective valve seats, said valve member being rotatably mounted relative to said valve stem, a clutch member to normally rotate said valve member from said valve stem and means operable through pressure of said valve member upon one of said valve seats to yield and allow relative motion between said clutch member and valve stem and enable said valve stem to rotate independently of said valve member.

2. A regrinding valve comprising a valve casing having two opposed valve seats, a valve member movable to selectively cover and uncover said respective valve seats to open and close independent passages, a valve stem operable to adjust said valve member to and from said respective valve seats, a driving member carried by said valve stem to interlock with and rotate said valve member, and means to yieldingly hold said driving member and valve member normally interlocked, said yielding means yielding automatically to release said interlocking connection when the frictional engagement between the valve member and one of said valve seats approaches a maximum.

3. A regrinding valve comprising a valve casing having two opposed valve seats, a valve member movable to selectively cover and uncover said respective valve seats to open and close independent passages, a valve stem operable to adjust said valve member to and from said respective valve seats, said valve member being rotatably mounted relative to said valve stem, and clutch means to yieldingly release said valve member in either direction from driving relation with said valve stem when the frictional engagement of said valve member with either of said valve seats approaches a maximum.

4. A valve comprising a valve casing having two opposed valve seats, a valve member movable to selectively cover and uncover said respective valve seats to open and close independent passages, means to adjust said valve member to and from said respective valve seats and to rotate said valve member with one of its valve faces in contact with one of said valve seats from the exterior of said valve casing and means to yieldingly release said valve member in either direction from its rotary driving relation when the frictional engagement of said valve with either of said valve seats approaches a maximum.

5. A regrinding valve comprising a valve casing having two opposed valve seats, a valve member movable to selectively cover and uncover said respective valve seats to open and close independent passages, a valve stem operable to adjust said valve member to and from said respective valve seats, said valve member being rotatably mounted relative to said valve stem, a driving member interposed between said valve member and said valve stem to normally rotate said valve member in either direction from said valve stem, and automatically actuated mechanism to release said valve member from driving relation with said valve stem when the frictional engagement of said valve member with either of said valve seats approaches a maximum, and to automatically re-engage said valve member in driving relation with said valve stem when the frictional engagement of said valve member with either of said valve seats is decreased.

6. A regrinding valve comprising a valve casing having two opposed valve seats, a valve member movable to selectively cover and uncover said respective valve seats to open and close independent passages, means to adjust said valve member to and from said respective valve seats and to rotate said valve member in frictional contact with either of said valve seats when said valve member is being applied to and removed from said valve seats from the exterior of the valve casing, and means to automatically yield and allow relative motion in either direction between said valve stem and said valve when the closing tension on said valve member approaches a maximum.

7. A regrinding valve comprising a valve casing having two opposed valve seats, a valve member movable to selectively cover and uncover said respective valve seats to open and close independent passages, a valve stem operable to adjust said valve member to and from said respective valve seats, means interposed between said valve member and valve stem to initially apply said valve member to either of said valve seats with a yielding tension, and a driving member mounted upon and rotatable with said valve stem, and yieldingly held in driving relation with said valve member to rotate said valve member in frictional contact with either of said valve seats when said valve member is being applied to and removed from said valve seats, and to automatically yield and allow relative movement between said valve stem and said valve member when the closing tension on said valve member approaches a maximum.

8. A self grinding valve comprising a valve casing having a valve seat, a valve stem operable from the exterior of the casing and movable endwise relative to the casing, a clutch member carried rigidly relative to the inner end of the valve stem, a valve adapted to engage said valve seat to close said valve port, said valve being provided with a clutch member held yieldingly in engagement with the clutch member on said valve stem, and said valve stem being adapted to positively force said valve against a fluid pressure into contact with said valve seat.

9. The combination of a valve head and a valve stem adapted to normally rotate together, and means operable through the frictional engagement of the valve head with a valve seat to cause the head and stem to rotate independently.

In testimony whereof I have affixed my signature.

ISRAEL B. GILBERT.